Aug. 24, 1948. J. D. LANGDON 2,447,510
ADJUSTABLE CHECK VALVE
Filed Feb. 5, 1944

J. D. Langdon
INVENTOR.

Patented Aug. 24, 1948

2,447,510

UNITED STATES PATENT OFFICE 2,447,510

ADJUSTABLE CHECK VALVE

Jesse D. Langdon, Long Beach, Calif.

Application February 5, 1944, Serial No. 521,244

4 Claims. (Cl. 251—50)

The instant invention relates to check valves, particularly for installation between a source of fluid supply and a pressure operated valve to be used for sanitary purposes. Also to adjust the flow rate from a source of fluid supply when it is desired to select or predetermine the delivery of fluid to the said pressure valve.

A primary object of this invention is to construct a noise and chatter proof check and shutoff valve.

A further object is to provide a self sealing packing for the threaded adjusting stem for the check valve.

A still further object aims to provide special forms for the various elements of the structure to form a co-ordinate combination whereby each element tends to increase the efficiency of the various other elements to form an efficient mechanical organization as a whole.

Another object is to provide a valve bonnet which may be readily fabricated from plastics or the like with internal threads to receive a valve stem and external threads for a casing and of such form that the double threaded part can be removed from the mold in a single operation.

Other and further objects and purposes will appear during the progress of the following specification which illustrates one form of reduction to practice. It is specifically understood that the invention is not confined to the form illustrated, and reduction to practice may be changed within the scope of what is claimed.

Figure 1:
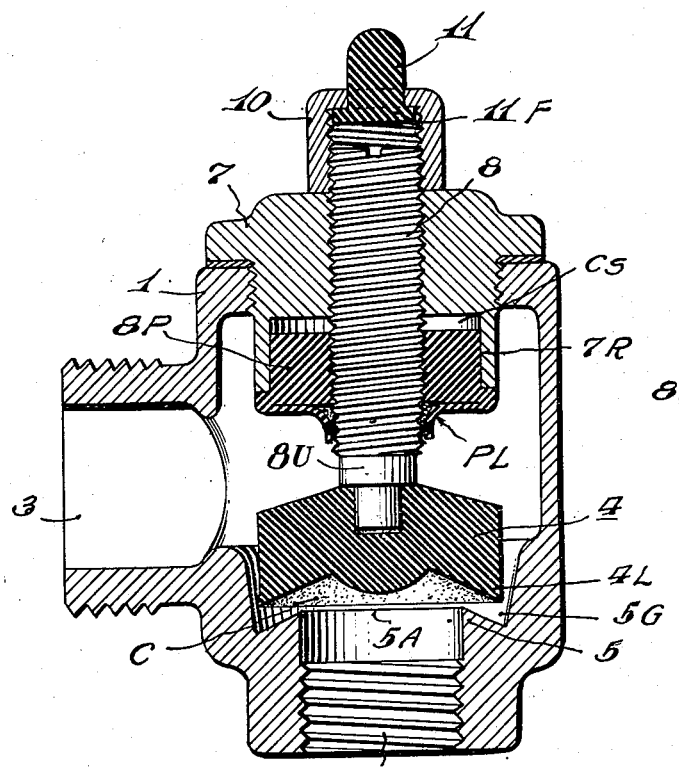
Fig. 1 is a longitudinal section of the complete assembly.

The structure of the instant invention consists of a casing 1, having an inlet 2, and an outlet 3, a valve member 4, having a forwardly projecting peripheral lip 4L, lying concentric with a substantially conical valve seat 5, surrounding the proximal end of inlet 2 and having apex 5A projecting toward a concavity C recessed in valve member 4, facing the inlet 2. The lip 4L forms a forwardly projecting periphery of valve member 4 registering with groove 5G, formed between the apex 5A of the coniform seat 5 and the inner wall of casing 1. This conformation provides the groove 5G into which the peripheral lip 4L is wedged when the valve is closed; the seat 5 tending to spread the lip 4L toward the inner wall of the casing 1 when forced home by threaded stem 8 having its inner unthreaded end 8U projecting toward the inlet 2.

Figure 3:
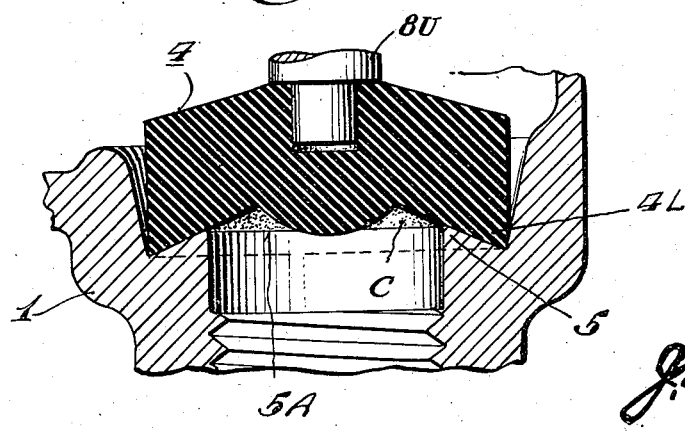
Fig. 3 is an enlarged fragmentary view in section of the valve and stem illustrating the check valve member and adjoining seat.

It is shown by Fig. 3 that the lip formed by the forwardly projecting rim 4L of the valve member 4 seats against the annular valve seat formed by the inner wall of the cylindrical slightly tapered recess at a point within the confines of the groove 5G; the annular seating of the valve member 4 preferably occurs just prior to the time when the forwardly facing concavity of the valve member bordering the lip 4L contacts the coniform rim forming the seat 5 and the bottom of the groove 5G. Thus the conical seat 5 urges the lip 4L radially outward to compensate for wear of the outer periphery of the valve 4 forming the lip 4L.

It will be seen that the valve member 4 enters a cylinderlike recess prior to contacting the seat 5. This cylinderlike recess is slightly tapered and allows fluid to pass around the peripheral lip 4L in a volume according to the depth to which the valve member 4 is adjustably inserted. It has been found that the combination of the cylindrical recess and the concavity C in the forward face of the valve 4 prevents noise and chattering of the valve member 4 slidably disposed on the end of the stem 8 which is threadedly disposed through the bonnet 7 which has a recess 7R into which the packing 8P is inserted. The packing 8P is made of material having suitable consistency to flex under fluid pressure exerted from within the valve casing 1.

It will be noted that Fig. 1 shows the valve member 4 to be thicker than the space between the upper portion thereof surrounding the stem 8 and the lip of the packing PL, therefore the valve member 4 contacts the packing 8P when permitted to do so by the adjustment of stem 8. The valve member 4 is urged snugly against the shoulder of the stem 8 by fluid pressure confined within the cylindrical recess surrounding and beneath the valve member 4 which contacts the packing as at PL immediately upon or prior to leaving the cylindrical recess above groove 5G. The valve stem 8 being adjustably cooperable with the valve member 4 to permit the same to rise under fluid pressure while the concavity C serves to partially confine the column of fluid under pressure to hold the valve member 4 snugly against the shoulder of the valve stem 8 while rising within the cylindrical recess of the inlet 2. Thus it will be seen that the stem 8, the packing 8P and the cylindrical recess of the inlet 2 are cooperably shaped and positioned to minimize any vibratory or sudden movement of the valve member after leaving the recess as at 5G until such time as the valve member is cushioned by the packing 8P.

When fluid pressure exists within the casing 1, clearance space CS provided between the packing 8P and the closed end of the recess 7R permits a flexing movement of the packing 8P which tends to compress the lower end of the packing 8P snugly around the stem and expand the upper end of the packing away from the stem but toward the closed end or recess 7R to ease the binding effect of the packing 8P under fluid pressure which tends to bypass stem 8. A thin packing lip PL extends downwardly and forwardly of the lower end of packing 8P and is formed to bind more tightly around the stem 8 than the balance of the packing 8P, which is flanged at its inner side.

The inner end of the stem 8 is shown by the drawings to be of a diameter permitting the end of the stem that is toward the inlet to enter the opening provided in the packing 8P for the stem 8. The packing 8P is made of deformable material capable of returning to shape after being deformed, thus accommodating any difference in the form of any portion of the stem 8 which may reside in the opening thru packing 8P to conform with the stem 8 according to the movement of the stem 8 which is adjustably inserted thru the packing 8P and the cap 7. Thus it will be seen that the unthreaded end 8U of stem 8 will be permitted to enter the packing 8P to the extent predetermined by the adjusted position of the stem 8.

The packing 8P is preferably molded of rubber or some similar substance with the threads formed by the molding process to fit the stem 8. This tends to cause much less friction and binding against the stem 8 than is the case when the threads in the flexible packing 8P are formed by forcing the stem 8 therethru.

A combined set-nut and bumper retaining nut 10 is screwed over the upper end of the stem 8 and, when tight, impinges the top of the bonnet 7, thus acting as a set or lock nut to hold the bonnet 7 and stem 8 in a unit to retain the stem 8 and valve 4 in any predetermined position. The movement of the valve member 4 on the reduced end of the stem 8 is limited by the unthreaded shoulder while inserted in the cylindrical recess above the groove 5G. The adjustment of the stem in up position permits the packing 8P to limit the movement of the valve member 4. A flanged resilient bumper 11 has a flange or shoulder 11F held by a rim or shoulder disposed radially inward of a hole extending through the top of nut 10. The flexible bumper is self retained due to the fact that any impingement against the exposed end of the bumper 11 causing the same to expand larger than the hole, as it is made of resilient material, and therefore cannot be pushed back thru the hole in the nut unless compressed radially inward before pressure is applied to the outer end thereof.

The bonnet 7 has an external thread and is screwed into the casing 1, using a thread having the same identical pitch as the internal thread provided for the stem 8. Thus when the bonnet 7 is molded of plastic material it can be screwed out of the mold because the external threads for the casing and the internal threads for the stem are of the same pitch.

The valve member 4 was previously patented by the present inventor and a metal insert was shown molded into a rubber body, see Fig. 4 of Patent 2,205,533, June 25, 1940. It has been found that a plastic valve member could be used with equal facility for sealing if a conical seat 5 were used to expand the periphery of the valve member to compensate for wear. The rubber valve member previously patented by the present inventor is automatically expanded by the liquid pressure itself, but it has been found desirable to expand more rigid plastics mechanically by the use of conical seat 5.

It will be noted that the lower end of the stem 8 has an unthreaded portion which acts to prevent the valve stem from being screwed entirely from the bonnet while the valve is under pressure; also the unthreaded shoulder acts in conjunction with the packing to seal the stem more tightly when the valve is in wide open position. The lower end of stem 8 is smaller in diameter forming a shoulder that rests on the conical top of the valve member 4. The conical top of valve member 4 acts to distribute the load or stem pressure over the entire area of the plastic valve member and prevents crumbling, cracking or splitting, and also streamlines the back of the valve 4 for the passage of fluid.

Figure 2:
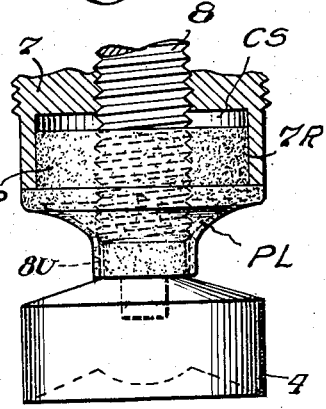
Fig. 2 is a sectional view of a fragmentary portion of the valve bonnet assembled with the packing, valve stem and valve member showing the relative position of the parts when the valve is in fully open position.

It will be seen that the valve member 4 entering the cylindrical recess formed above the groove 5G is held firmly against the unthreaded shoulder of the stem 8 by fluid under pressure entering the valve casing thru inlet 2 and the valve member 4 is raised above the top of the cylindrical recess until it is urged against the packing 8P which then cushions the valve member 4 against chattering and urges the same counterwise to the pressure of the fluid entering thru the inlet 2. Therefore it will be seen that a special form of cylindrical recess 7R is required in the lower end of the cap 7 to provide a frictional stress against turning the packing 8P with the stem because the space CS does not provide a frictional area to prevent the packing 8P from turning with the stem 8. Fig. 2 is particularly pertinent in illustrating the foregoing descriptive matter relative to the packing.

Having described my invention, the new and novel features and results obtained, the following claims are made:

1. An adjustable check valve comprising a casing having an inlet and an outlet, one end of said casing closed by a bonnet having a recess with an open end facing said inlet, a packing inserted in said recess and having a stem receiving opening therethru, a valve stem adjustably threaded thru said bonnet and packing and having an inner end projecting toward said inlet, the inner face of said packing being exposed to pressure within said casing, a valve member slidably connected to the end of said valve stem that is toward said inlet and adapted to seat across said inlet, said packing being made of deformable material capable of returning to normal shape after being deformed, the inner end of said stem being of a diameter to pass thru the opening in said packing whereby said valve member will contact said packing when in fully opened position.

2. A valve as of claim 1 wherein the packing is spaced away from the bottom of the recess together with means for anchoring the outer periphery of said packing to the surrounding wall of said recess, the space permitting that side of the packing that is toward the outside of the bonnet to move toward the closed end of said recess when pressure is exerted from the inner side of said packing whereby the inner face of said packing is urged snugly around said valve stem.

3. A valve as of claim 1 wherein the inlet is recessed to form a counterbore substantially as deep as the distance between the top of the valve member and that part of the inner face of the packing that is nearest said outlet, said counterbore being tapered and converging toward a seat surrounding the inlet whereby the passage of pressure fluid is confined to an area concentric to and surrounding said valve member when said valve member has been raised from the inlet, the pressure fluid entering thru said inlet being confined by the bore above the inlet and tending to urge said valve member snugly against the stem when said valve member is brought into contact with said packing.

4. A valve as defined in claim 1, wherein said packing has a forwardly projecting lip surrounding and contacting the inner end of said stem.

JESSE D. LANGDON.

REFERENCES CITED

The following references are of record in the file of this patent:

UNITED STATES PATENTS

| Number | Name | Date |
| --- | --- | --- |
| 530,478 | Frisbie | Dec. 4, 1894 |
| 854,138 | Whitaker | May 21, 1907 |
| 1,589,894 | Mueller | June 22, 1926 |
| 1,944,428 | Hammon | Jan. 23, 1934 |
| 2,042,845 | Henry | June 2, 1936 |
| 2,205,533 | Langdon | June 25, 1940 |
| 2,260,523 | Henry | Oct. 28, 1941 |

FOREIGN PATENTS

| Number | Country | Date |
| --- | --- | --- |
| 320,744 | Great Britain | 1928 |
| 463,363 | Great Britain | 1937 |